US011768079B2

United States Patent
Galliano, III et al.

(10) Patent No.: US 11,768,079 B2
(45) Date of Patent: Sep. 26, 2023

(54) INTELLIGENT ROUTE SELECTION FOR AUTONOMOUS VEHICLE DELIVERY SYSTEM

(71) Applicant: GM Cruise Holdings LLC, San Francisco, CA (US)

(72) Inventors: Anthony Galliano, III, Seattle, WA (US); Arun A. Mathews, Newcastle, WA (US); Charlotte Blanc, Seattle, WA (US); Pratik Palnitkar, Klirkland, WA (US)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 372 days.

(21) Appl. No.: 16/730,916

(22) Filed: Dec. 30, 2019

(65) Prior Publication Data
US 2021/0199453 A1   Jul. 1, 2021

(51) Int. Cl.
*G01C 21/34* (2006.01)
*G06Q 10/0835* (2023.01)
(Continued)

(52) U.S. Cl.
CPC ..... *G01C 21/3453* (2013.01); *G01C 21/3697* (2013.01); *G05D 1/0088* (2013.01); *G06Q 10/0832* (2013.01); *G06Q 10/08355* (2013.01)

(58) Field of Classification Search
CPC ...... G06Q 10/08; G06Q 10/017; G06F 16/29; G01C 21/343
See application file for complete search history.

(56) References Cited

U.S. PATENT DOCUMENTS 10,107,635 B2   10/2018   Larner et al.
10,794,715 B1   10/2020   Truong et al.
(Continued)

FOREIGN PATENT DOCUMENTS

WO   2021015663 A1   1/2021

OTHER PUBLICATIONS

Liu, Mian, Guo-Long Lin, and Zhi-Hua Hu. "Study on multi-objective optimization model for fragile production logistics path selection based on risk and cost." 2010 International Conference of Information Science and Management Engineering. vol. 2. IEEE, 2010. (Year: 2010).*

(Continued)

*Primary Examiner* — Russell Frejd
*Assistant Examiner* — Ana D Thomas
(74) *Attorney, Agent, or Firm* — Akona IP

(57) ABSTRACT

The present disclosure provides a method comprising identifying at least one of a characteristic and an identity of an item for delivery from an origin to a destination; identifying a plurality of possible routes between the origin and the destination using mapping information, the mapping information including for each of the plurality of possible routes, a characterization of each of a plurality of route segments comprising the possible route; evaluating the plurality of possible routes in view of the identified at least one of the item characteristic and the item identity to select one of the plurality of possible routes; and providing the selected one of the plurality of possible routes to a vehicle, wherein the vehicle delivers the item from the origin to the destination via the identified route.

20 Claims, 6 Drawing Sheets

(51) Int. Cl.
    *G05D 1/00*     (2006.01)
    *G06Q 10/0832*     (2023.01)
    *G01C 21/36*     (2006.01)

(56) References Cited

U.S. PATENT DOCUMENTS

| | | |
|---|---|---|
| 11,222,299 B1 | 1/2022 | Baalke et al. |
| 2004/0243353 A1 | 12/2004 | Aghassipour |
| 2014/0257621 A1* | 9/2014 | Zych .................... G01C 21/20 |
| | | 701/410 |
| 2017/0213273 A1 | 7/2017 | Dietrich et al. |
| 2018/0018619 A1* | 1/2018 | Kisiler ................. G06Q 10/083 |
| 2018/0052000 A1* | 2/2018 | Larner ................. G05D 1/0212 |
| 2019/0114564 A1* | 4/2019 | Ferguson ......... G06Q 10/06312 |
| 2019/0146508 A1 | 5/2019 | Dean et al. |
| 2020/0134556 A1 | 4/2020 | Lahav |
| 2020/0380467 A1 | 12/2020 | Chen |
| 2020/0406906 A1 | 12/2020 | Omari et al. |
| 2022/0036310 A1* | 2/2022 | Heinla ................. G06Q 10/047 |

OTHER PUBLICATIONS

Wang, Chuanxu, and Liangkui Jiang. "Path selection and emergency item allocation model based on fuzzy multiple objective programming." 2010 Seventh International Conference on Fuzzy Systems and Knowledge Discovery. vol. 2. IEEE, 2010. (Year: 2010).*

USPTO Non-Final Office Action issued in U.S. Appl. No. 16/730,969 dated Mar. 16, 2022; 45 pages.

USPTO Non-Final Office Action issued in U.S. Appl. No. 16/730,963 dated May 18, 2022; 28 pages.

* cited by examiner

INTELLIGENT ROUTE SELECTION FOR AUTONOMOUS VEHICLE DELIVERY SYSTEM

TECHNICAL FIELD OF THE DISCLOSURE

The present disclosure relates generally to autonomous vehicles (AVs) and, more specifically, to devices and methods for AV delivery route selection based on delivery contents and mapping data.

BACKGROUND

Fast, efficient, and safe transportation of a delivery from its point of origin to its destination may depend on a number of factors, including the characteristics of the delivery itself (which may include fragile, liquid, or sturdy, for example) and the condition of the road segments that make up the selected route (e.g., smooth, full of potholes, and/or riddled with speed bumps.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DESCRIPTION OF EXAMPLE EMBODIMENTS OF THE DISCLOSURE

Figure 1:
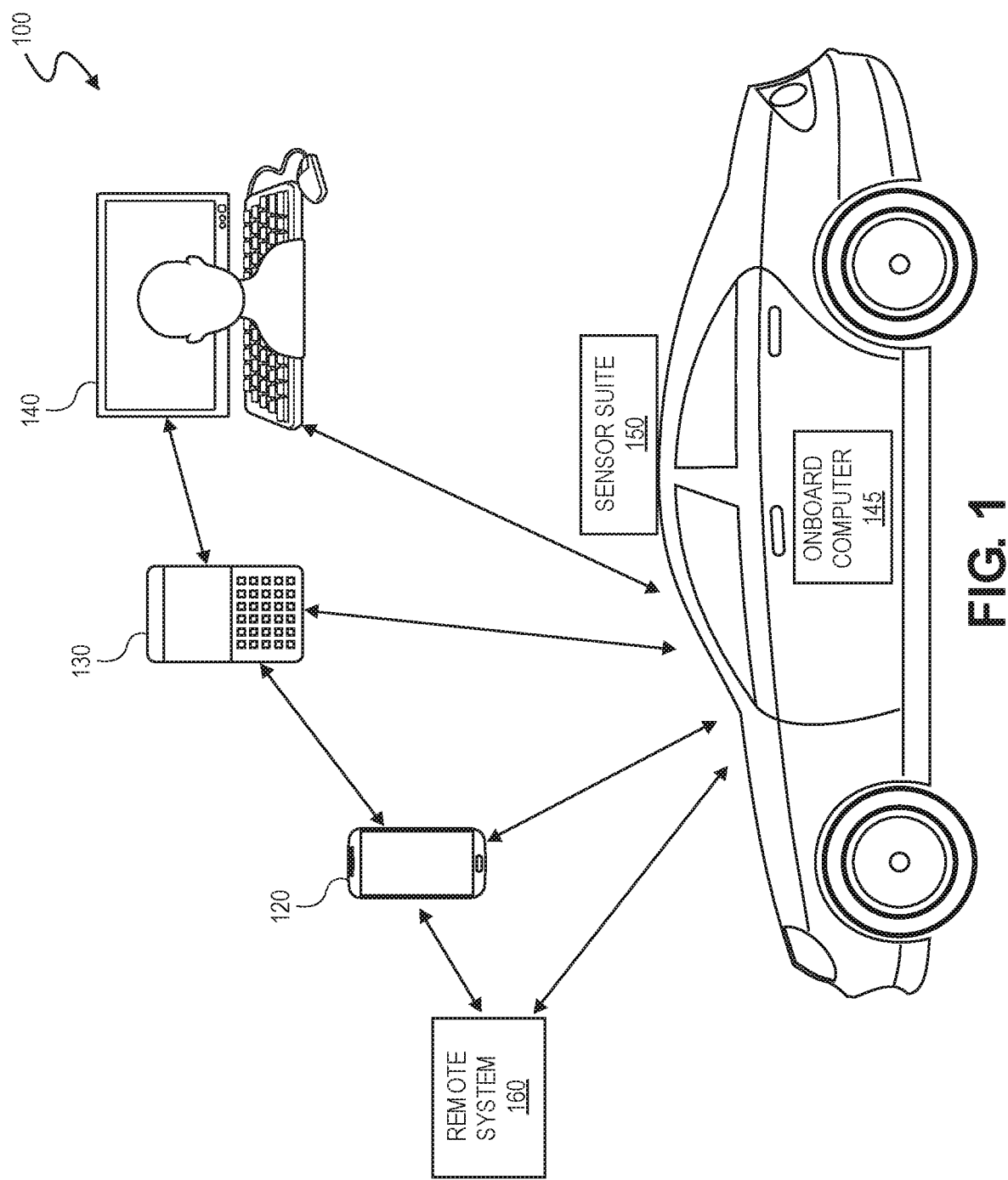
FIG. 1 is a block diagram illustrating an example autonomous vehicle in which an intelligent delivery system according to some embodiments of the present disclosure may be implemented.

The systems, methods and devices of this disclosure each have several innovative aspects, no single one of which is solely responsible for the all of the desirable attributes disclosed herein. Details of one or more implementations of the subject matter described in this specification are set forth in the description below and the accompanying drawings.

Embodiments of the present disclosure provide a method comprising identifying at least one of a characteristic and an identity of an item for delivery from an origin to a destination; identifying a plurality of possible routes between the origin and the destination using mapping information, the mapping information including for each of the plurality of possible routes, a characterization of each of a plurality of route segments comprising the possible route; evaluating the plurality of possible routes in view of the identified at least one of the item characteristic and the item identity to select one of the plurality of possible routes; and providing the selected one of the plurality of possible routes to a vehicle, wherein the vehicle delivers the item from the origin to the destination via the identified route.

Embodiments of the present disclosure further provide an intelligent delivery system for a vehicle, the intelligent delivery system comprising at least one sensing device for determining at least one of a characteristic and an identity of an item for delivery from an origin to a destination; a mapping information module for storing mapping information comprising information regarding a plurality of possible routes from the origin to the destination, the mapping information including for each of the plurality of possible routes, a characterization of each of a plurality of route segments comprising the possible route; and a route selection module for evaluating the plurality of possible routes in view of the identified at least one of the item characteristic and the item identity to select one of the plurality of possible routes.

Embodiments of the present disclosure still further provide a vehicle comprising an onboard computer; a sensor suite comprising a plurality of imaging devices and at least one sensing device for determining at least one of a characteristic and an identity of an item for delivery from an origin to a destination; a mapping information module for storing mapping information comprising information regarding a plurality of possible routes from the origin to the destination, the mapping information including for each of the plurality of possible routes, a characterization of each of a plurality of route segments comprising the possible route; and a route selection module for evaluating the plurality of possible routes in view of the identified at least one of the item characteristic and the item identity to select one of the plurality of possible routes.

Embodiments disclosed herein may be particularly advantageous for selecting which of a plurality of possible routes will be taken by an AV to deliver an item, or delivery, from an origin to a destination based on characteristics and/or an identity of the item being delivered and mapping data indicating a condition of various segments of the possible routes. Additionally, user and/or vehicle feedback may be provided during or after the delivery and may be used to update mapping data used in route selection. Moreover, additional constraints and considerations, such as price charged, amount of fuel available or consumed, and/or amount of time to complete the delivery may also be considered in selecting which of the plurality of possible routes should be taken.

As will be appreciated by one skilled in the art, aspects of the present disclosure, in particular aspects of an intelligent delivery system for an autonomous vehicle, described herein, may be embodied in various manners (e.g., as a method, a system, a computer program product, or a computer-readable storage medium). Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by one or more hardware processing units, e.g. one or more microprocessors, of one or more computers. In various embodiments, different steps and portions of the steps of each of the methods described herein may be performed by different processing units. Furthermore, aspects of the present disclosure may take the form of a computer program product embodied in one or more computer readable medium(s), preferably non-transitory, having computer readable program code embodied, e.g., stored, thereon. In various embodiments, such a computer program may, for example, be downloaded (updated) to the existing devices and systems (e.g. to the existing system devices and/or their controllers, etc.) or be stored upon manufacturing of these devices and systems.

The following detailed description presents various descriptions of specific certain embodiments. However, the innovations described herein can be embodied in a multitude of different ways, for example, as defined and covered by the claims and/or select examples. In the following description, reference is made to the drawings in which like reference numerals can indicate identical or functionally similar elements. It will be understood that elements illustrated in the drawings are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming; it would nevertheless be a routine undertaking for those of ordinary skill in the art having the benefit of this disclosure.

In the Specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above", "below", "upper", "lower", "top", "bottom", or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature, length, width, etc.) of an element, operations, and/or conditions, the phrase "between X and Y" represents a range that includes X and Y.

Other features and advantages of the disclosure will be apparent from the following description and the claims.

One embodiment is a system for autonomous vehicle delivery route selection based on delivery contents and mapping data. In particular, the system enables selection of one of a plurality of possible routes that will be taken by an autonomous vehicle to transport an item, or delivery, from an origin to a destination based on characteristics and/or an identity of the item being delivered and mapping data indicating a condition of various segments of the possible routes. Additionally, user and/or vehicle feedback may be provided during or after the delivery and may be used to update mapping data used in route selection. Moreover, additional constraints and considerations, such as cost, amount of fuel available or consumed, and/or amount of time to complete the delivery may also be considered in selecting one of the plurality of possible routes to be taken.

As shown in FIG. 1, an intelligent delivery system 100 embodying features described herein includes an autonomous vehicle 110 including a passenger interface 120, a vehicle coordinator 130, and/or a remote expert interface 140. In certain embodiments, the remote expert interface 140 allows a non-passenger entity to set and/or modify the behavior settings of the autonomous vehicle 110. The non-passenger entity may be different from the vehicle coordinator 130, which may be a server.

A remote facility 160, which may comprise a central office or back office facility, may also be provided for providing the autonomous vehicle 110 (and particularly, the onboard computer 145) with a number of different system backend functions. The remote facility 160 may include one or more switches, servers, databases, live advisors, and/or an automated voice response system ("VRS"). Remote facility 160 may include any or all of the aforementioned components, which may be coupled to one another via a wired or wireless local area network (LAN). Remote facility 160 may receive and transmit data via one or more appropriate devices and network from and to the autonomous vehicle 110, such as by wireless systems, such as 882.11x, GPRS, and the like. A database at the remote facility 160 can store account information such as subscriber authentication information, vehicle identifiers, profile records, behavioral patterns, and other pertinent subscriber information. The remote facility 160 may also include a database of roads, routes, locations, etc. permitted for use by autonomous vehicle 110. The remote facility 160 may communicate with the autonomous vehicle 110 to provide route guidance in response to a request received from the vehicle.

For example, based upon information stored in a mapping system of the remote facility 160, the remote facility may determine the conditions of various roads or portions thereof. Autonomous vehicles, such as the autonomous vehicle 110, may, in the course of determining a navigation route, receive instructions from the remote facility 160 regarding which roads or portions thereof, if any, are appropriate for use under certain circumstances, as described hereinbelow. Such instructions may be based in part on information received from the autonomous vehicle 110 or other autonomous vehicles regarding road conditions Accordingly, remote facility 160 may receive information regarding the roads/routes generally in real-time from one or more vehicles.

The system 100 functions to enable an autonomous vehicle 110 to modify and/or set a driving behavior in response to parameters set by vehicle passengers (e.g., via the passenger interface 120) and/or other interested parties (e.g., via the vehicle coordinator 130 or remote expert interface 140). In accordance with features of embodiments described herein, the system 100 further functions to enable autonomous vehicle 110 to modify and/or set a driving behavior and/or route automatically in response to delivery contents or other considerations or factors. Driving behavior of an autonomous vehicle may be modified according to explicit input or feedback (e.g., a passenger specifying a maximum speed or a relative comfort level), implicit input or feedback (e.g., a passenger's heart rate), or any other suitable data or manner of communicating driving behavior preferences.

The autonomous vehicle 110 is preferably a fully autonomous automobile, but may additionally or alternatively be any semi-autonomous or fully autonomous vehicle; e.g., a boat, an unmanned aerial vehicle, a driverless car, etc. Additionally, or alternatively, the autonomous vehicles may be vehicles that switch between a semi-autonomous state and a fully autonomous state and thus, some autonomous vehicles may have attributes of both a semi-autonomous vehicle and a fully autonomous vehicle depending on the state of the vehicle.

The autonomous vehicle 110 preferably includes a throttle interface that controls an engine throttle, motor speed (e.g., rotational speed of electric motor), or any other movement-enabling mechanism; a brake interface that controls brakes of the autonomous vehicle (or any other movement-retarding mechanism); and a steering interface that controls steering of the autonomous vehicle (e.g., by changing the angle of wheels of the autonomous vehicle). The autonomous vehicle 110 may additionally or alternatively include interfaces for control of any other vehicle functions; e.g., windshield wipers, headlights, turn indicators, air conditioning, etc.

In addition, the autonomous vehicle 110 preferably includes an onboard computer 145 and a sensor suite 150 (e.g., computer vision ("CV") system, LIDAR, RADAR, wheel speed sensors, GPS, cameras, etc.). The onboard computer 145 functions to control the autonomous vehicle 110 and processes sensed data from the sensor suite 150 and/or other sensors in order to determine the state of the autonomous vehicle 110. Based upon the vehicle state and programmed instructions, the onboard computer 145 preferably modifies or controls driving behavior of the autonomous vehicle 110.

Driving behavior may include any information relating to how an autonomous vehicle drives (e.g., actuates brakes, accelerator, steering) given a set of instructions (e.g., a route or plan). Driving behavior may include a description of a controlled operation and movement of an autonomous vehicle and the manner in which the autonomous vehicle applies traffic rules during one or more driving sessions. Driving behavior may additionally or alternatively include any information about how an autonomous vehicle calculates routes (e.g., prioritizing fastest time vs. shortest distance), other autonomous vehicle actuation behavior (e.g., actuation of lights, windshield wipers, traction control settings, etc.) and/or how an autonomous vehicle responds to environmental stimulus (e.g., how an autonomous vehicle behaves if it is raining, or if an animal jumps in front of the vehicle). Some examples of elements that may contribute to driving behavior include acceleration constraints, deceleration constraints, speed constraints, steering constraints, suspension settings, routing preferences (e.g., scenic routes, faster routes, no highways), lighting preferences, action profiles (e.g., how a vehicle turns, changes lanes, or performs a driving maneuver), and action frequency constraints (e.g., how often a vehicle changes lanes).

The onboard computer 145 functions to control the operations and functionality of the autonomous vehicles 110 and processes sensed data from the sensor suite 150 and/or other sensors in order to determine states of the autonomous vehicles no. Based upon the vehicle state and programmed instructions, the onboard computer 145 preferably modifies or controls behavior of autonomous vehicles 110. The onboard computer 145 is preferably a general-purpose computer adapted for I/O communication with vehicle control systems and sensor systems, but may additionally or alternatively be any suitable computing device. The onboard computer 145 is preferably connected to the Internet via a wireless connection (e.g., via a cellular data connection). Additionally or alternatively, the onboard computer 145 may be coupled to any number of wireless or wired communication systems.

The sensor suite 150 preferably includes localization and driving sensors; e.g., photodetectors, cameras, RADAR, SONAR, LIDAR, GPS, inertial measurement units (IMUS), accelerometers, microphones, strain gauges, pressure monitors, barometers, thermometers, altimeters, etc.

In certain embodiments, information collected by autonomous vehicles, such as autonomous vehicle 110, may be provided to the remote facility 160, which may establish a database or map of routes in a given area or region where use of an autonomous driving system may be permitted. Information may be collected from vehicles in real-time, i.e., as the vehicle(s) traverses the route(s) in question. Information may be analyzed by a central office of the remote facility 160 in real-time, or on a periodic basis. The information may be provided to vehicles collectively in the area, e.g., by way of a central database or map. For example, vehicles may pull route information from the database/map to determine appropriate route(s) for use of an autonomous driving system in any manner that is convenient. In some examples, a vehicle telematics unit may selectively communicate with the remote facility to determine whether a route may be used with an autonomous driving system. In accordance with another aspect of the invention, there is provided a system for communicating with a plurality of vehicles may include a plurality of telematics units installed into each of the vehicles. The telematics units are configured to collect route information as the vehicles are traveling along a vehicle route.

Figure 2:
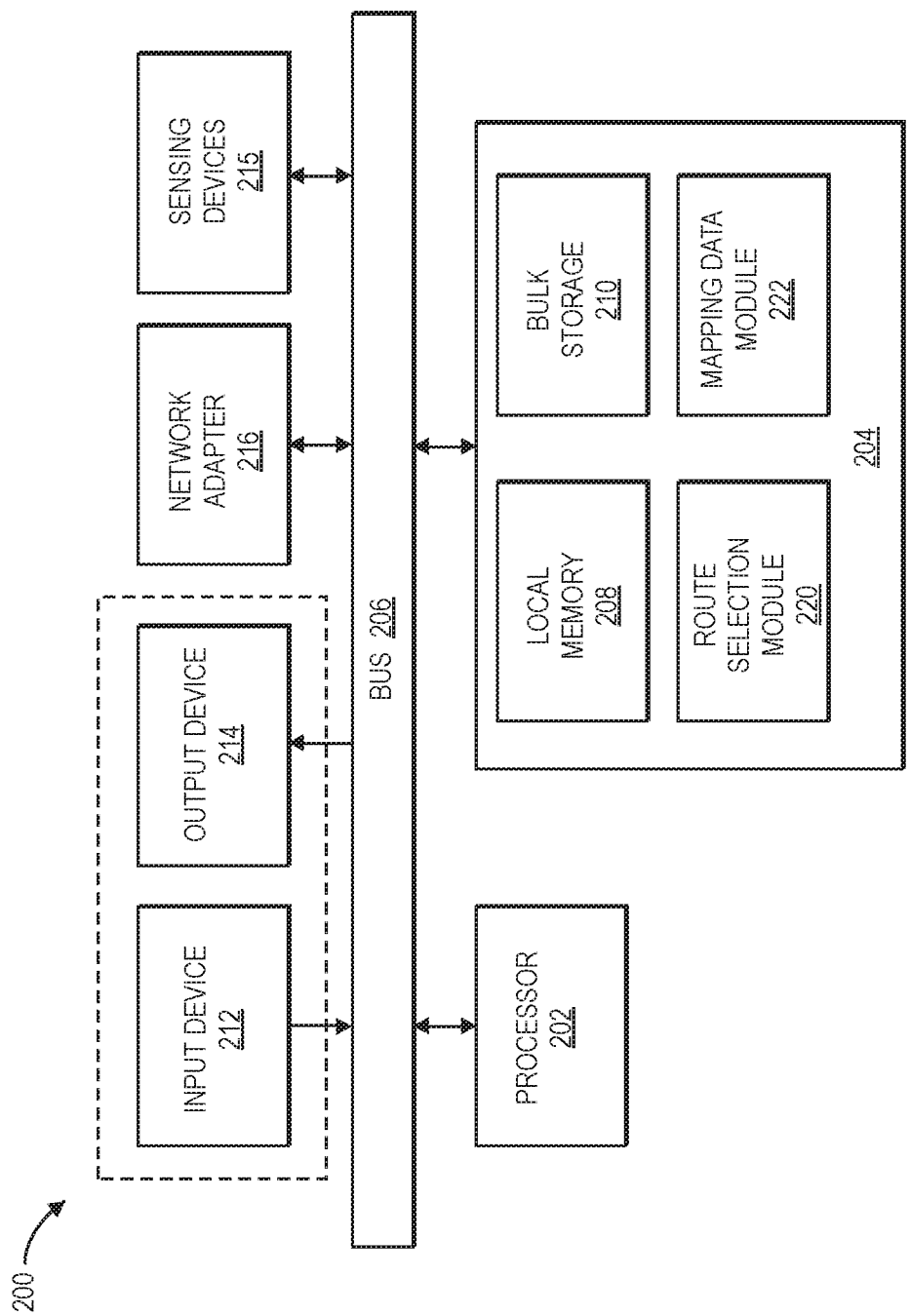
FIG. 2 is a block diagram illustrating an example intelligent delivery system according to some embodiments of the present disclosure.

FIG. 2 is a block diagram illustrating an example system 200 that may be configured to implement at least portions of an intelligent delivery system for an autonomous vehicle, such as the autonomous vehicle 110, in accordance with embodiments described herein, and more particularly as shown in the FIGURES described hereinabove. Part or all of the intelligent delivery system 200 may be implemented as a sensor suite, such as the sensor suite 150, and/or an onboard computer, such as onboard computer 145, and/or a remote system, such as remote facility 160. As shown in FIG. 2, the intelligent delivery system 200 may include at least one processor 202, e.g. a hardware processor 202, coupled to memory elements 204 through a system bus 206. As such, the system may store program code and/or data within memory elements 204. Further, the processor 202 may execute the program code accessed from the memory elements 204 via a system bus 206. In one aspect, the system may be implemented as a computer that is suitable for storing and/or executing program code (e.g., onboard computer 145). It should be appreciated, however, that the system 200 may be implemented in the form of any system including a processor and a memory that is capable of performing the functions described in this disclosure.

In some embodiments, the processor 202 can execute software or an algorithm to perform the activities as discussed in this specification; in particular, activities related to an intelligent delivery system for an autonomous vehicle in accordance with embodiments described herein. The processor 202 may include any combination of hardware, software, or firmware providing programmable logic, including by way of non-limiting example a microprocessor, a DSP, a field-programmable gate array (FPGA), a programmable logic array (PLA), an integrated circuit (IC), an application specific IC (ASIC), or a virtual machine processor. The processor 202 may be communicatively coupled to the memory element 204, for example in a direct-memory access (DMA) configuration, so that the processor 202 may read from or write to the memory elements 204.

In general, the memory elements 204 may include any suitable volatile or non-volatile memory technology, including double data rate (DDR) random access memory (RAM), synchronous RAM (SRAM), dynamic RAM (DRAM), flash, read-only memory (ROM), optical media, virtual memory regions, magnetic or tape memory, or any other suitable technology. Unless specified otherwise, any of the memory elements discussed herein should be construed as being encompassed within the broad term "memory." The information being measured, processed, tracked or sent to or from any of the components of the system 200 could be provided in any database, register, control list, cache, or storage structure, all of which can be referenced at any suitable timeframe. Any such storage options may be included within the broad term "memory" as used herein. Similarly, any of the potential processing elements, modules, and machines described herein should be construed as being encompassed within the broad term "processor." Each of the elements shown in the present figures may also include suitable interfaces for receiving, transmitting, and/or otherwise communicating data or information in a network environment so that they can communicate with, for example, a system having hardware similar or identical to another one of these elements.

In certain example implementations, mechanisms for implementing an intelligent delivery system for an autonomous vehicle as outlined herein may be implemented by logic encoded in one or more tangible media, which may be inclusive of non-transitory media, e.g., embedded logic provided in an ASIC, in DSP instructions, software (potentially inclusive of object code and source code) to be executed by a processor, or other similar machine, etc. In some of these instances, memory elements, such as e.g. the memory elements 204 shown in FIG. 2, can store data or information used for the operations described herein. This includes the memory elements being able to store software, logic, code, or processor instructions that are executed to carry out the activities described herein. A processor can execute any type of instructions associated with the data or information to achieve the operations detailed herein. In one example, the processors, such as e.g. the processor 202 shown in FIG. 2, could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., an FPGA, a DSP, an erasable programmable read-only memory (EPROM), an electrically erasable programmable read-only memory (EEPROM)) or an ASIC that includes digital logic, software, code, electronic instructions, or any suitable combination thereof.

The memory elements 204 may include one or more physical memory devices such as, for example, local memory 208 and one or more bulk storage devices 210. The local memory may refer to RAM or other non-persistent memory device(s) generally used during actual execution of the program code. A bulk storage device may be implemented as a hard drive or other persistent data storage device. The processing system 200 may also include one or more cache memories (not shown) that provide temporary storage of at least some program code in order to reduce the number of times program code must be retrieved from the bulk storage device 210 during execution.

As shown in FIG. 2, the memory elements 204 may store a route selection module 220 and a mapping data module 222. In various embodiments, the modules 220, 222, may be stored in the local memory 208, the one or more bulk storage devices 210, or apart from the local memory and the bulk storage devices. It should be appreciated that the system 200 may further execute an operating system (not shown in FIG. 2) that can facilitate execution of the modules 220, 222. The modules 220, 222, being implemented in the form of executable program code and/or data, can be read from, written to, and/or executed by the system 200, e.g., by the processor 202. Responsive to reading from, writing to, and/or executing one of the modules 220, 222, the system 200 may be configured to perform one or more operations or method steps described herein.

Input/output (I/O) devices depicted as an input device 212 and an output device 214, optionally, may be coupled to the system. Examples of input devices may include, but are not limited to, a keyboard, a pointing device such as a mouse, or the like. Examples of output devices may include, but are not limited to, a monitor or a display, speakers, or the like. In some implementations, the system may include a device driver (not shown) for the output device 214. Input and/or output devices 212, 214 may be coupled to the system 200 either directly or through intervening I/O controllers. Additionally, sensing devices 215, may be coupled to the system 200. Examples of sensing devices 215 may include, but are not limited to, cameras (located inside and/or outside the vehicle), LIDARs, RADARs, scales, QR code readers, bar code readers, RF sensors, and others. Sensing devices 215 may be coupled to the system 200 either directly or through intervening controllers and/or drivers.

Cameras may be implemented using high-resolution imagers with fixed mounting and field of view. LIDARs may be implemented using scanning LIDARs with dynamically configurable field of view that provides a point-cloud of the region intended to scan. RADARs may be implemented using scanning RADARs with dynamically configurable field of view.

In an embodiment, the input and the output devices may be implemented as a combined input/output device (illustrated in FIG. 2 with a dashed line surrounding the input device 212 and the output device 214). An example of such a combined device is a touch sensitive display, also sometimes referred to as a "touch screen display" or simply "touch screen". In such an embodiment, input to the device may be provided by a movement of a physical object, such as e.g. a stylus or a finger of a user, on or near the touch screen display.

A network adapter 216 may also, optionally, be coupled to the system 200 to enable it to become coupled to other systems, computer systems, remote network devices, and/or remote storage devices through intervening private or public networks. The network adapter may comprise a data receiver for receiving data that is transmitted by said systems, devices and/or networks to the system 200, and a data transmitter for transmitting data from the system 200 to said systems, devices and/or networks. Modems, cable modems, and Ethernet cards are examples of different types of network adapter that may be used with the system 200.

Figure 3:
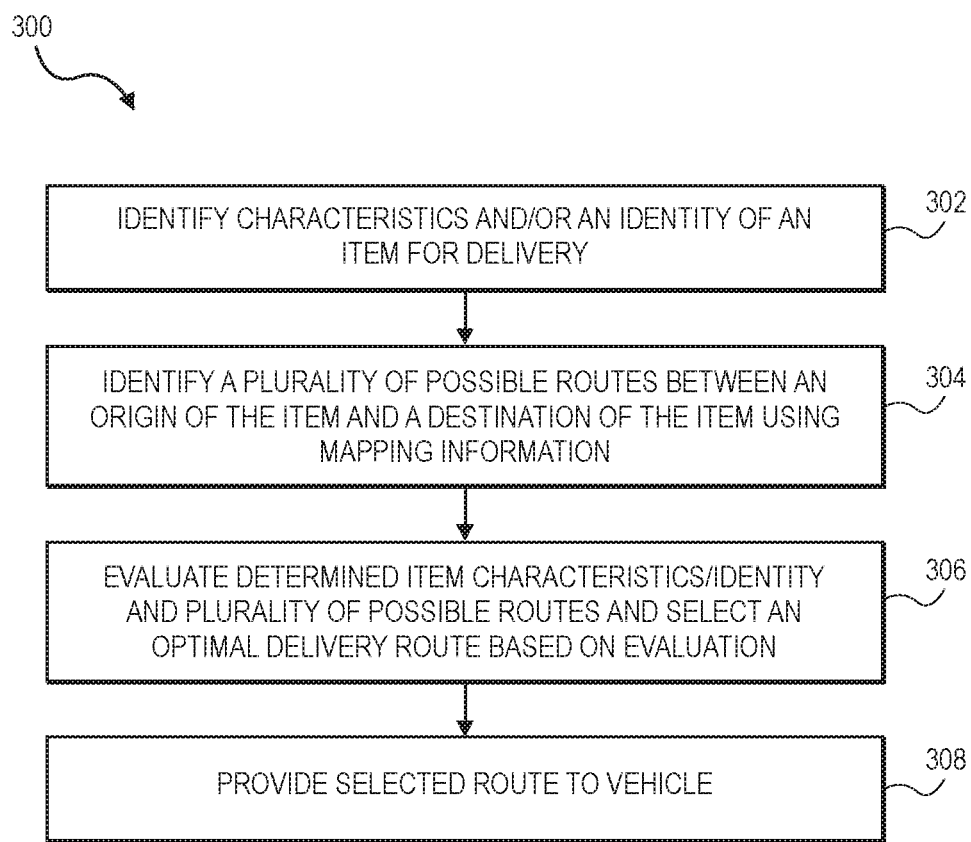
FIG. 3 is a flowchart of an example method implemented by an example intelligent delivery system according to some embodiments of the present disclosure.

FIG. 3 is a flowchart of an example method 300 implemented by an intelligent delivery system according to some embodiments of the present disclosure, such as the intelligent delivery system 200 of FIG. 2. In step 302, characteristics and/or an identity of an item for delivery are determined. It will be recognized that this step may be performed in any number of manners. For example, the item for delivery may have affixed thereto a code (such as a bar code or QR code, for example) or an RF ID that may be read by an appropriate sensor disposed within the vehicle. Alternatively, visual sensors, such as a camera, may be used to discern characteristics and/or the identity of the item. Still further, information regarding characteristics and/or an identity of the item may be provided by an individual, such as a system administrator or operator. The information gleaned in step 302 may include such information as physical state of the item (e.g., solid or liquid), a durability of the item (e.g., sturdy or fragile), and whether or not the item is perishable (and if so, within what time frame), for example.

In step 304, a plurality of possible routes between an origin of the item and a destination of the item may be identified using mapping information.

In step 306, the information regarding characteristics and/or an identity of the item as well as the plurality of possible routes are evaluated to select an optimal delivery route, e.g., by weighting segments of each route based on the condition of the segment. For example, if the item being delivered is fragile (e.g., a flower arrangement) and/or a liquid (e.g., a container of soup), a longer, but smoother, route (i.e., a route with a high percentage of route segments characterized in mapping information as smooth) may be preferable over a shorter, but bumpier, route, with the increase in delivery time being justifiable in view of the desire to avoid spilling or damaging the item. Alternatively, if the item being delivered is sturdy and durable (e.g., a well-packed box), a shorter, if bumpier, route (i.e., a route with a high percentage of route segments characterized in mapping information as "rough") may be preferable to decrease delivery time. For items that are neither particularly sensitive or durable, an intermediate route (i.e., a route having a high percentage of route segments characterized as "moderate") may be selected.

In step 308, the selected route is provided to the vehicle.

Figure 4:
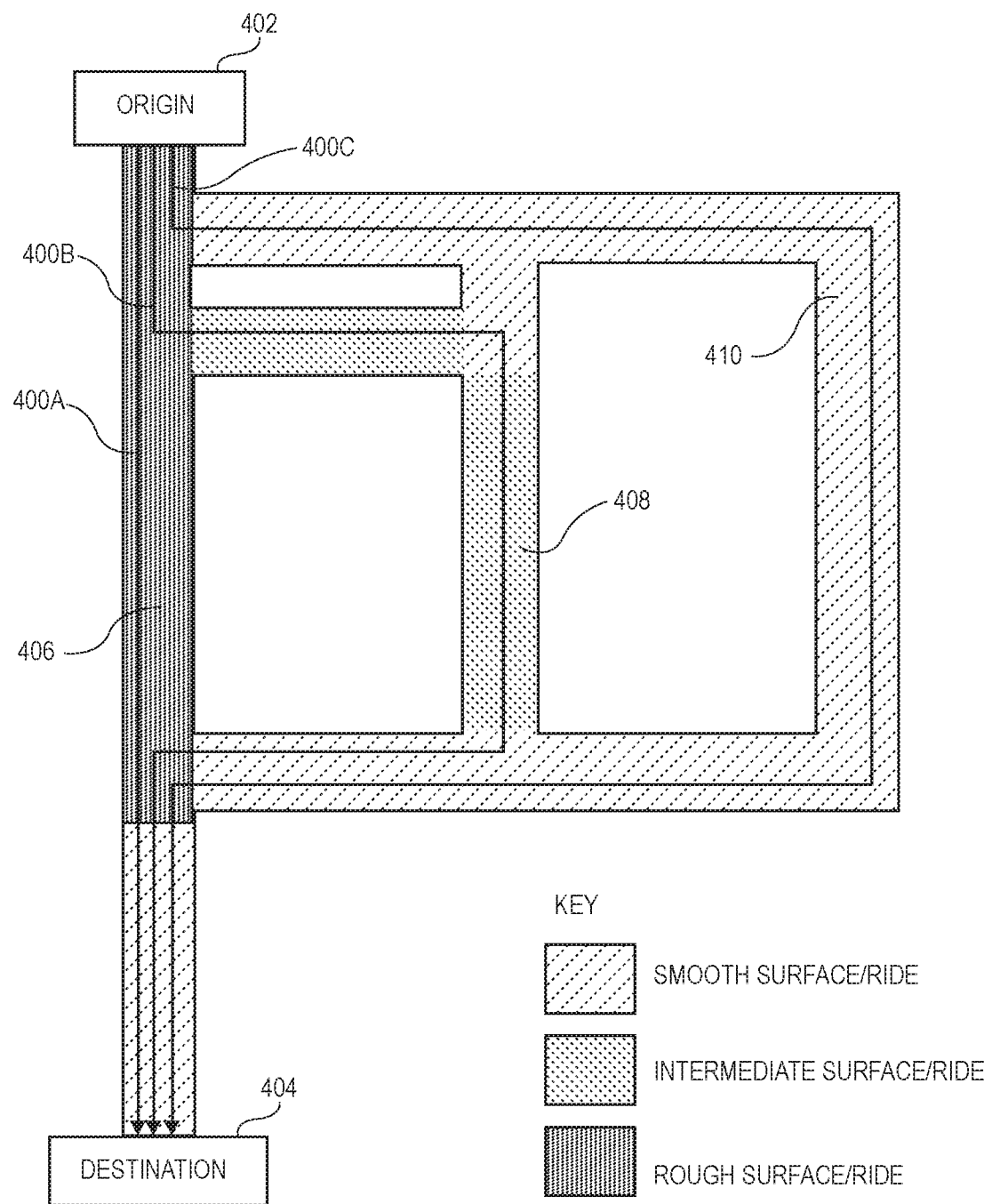
FIG. 4 illustrates a number of possible routes between an origin and a destination for providing a visual illustration of route selection performed by an intelligent delivery system according to some embodiments of the present disclosure.

FIG. 4 provides a visual illustration of route selection in accordance with embodiments described herein. In particular, FIG. 4 illustrates a number of possible routes 400A-400C between an origin 402 and a destination 404. As also shown in FIG. 4, a number of route segments, e.g., segment 406, are characterized (or designated or identified) in mapping information as "rough." As used herein, a "rough" route segment is one that the vehicle (and passengers or contents thereof) experiences as bumpy and/or bouncy, either constantly or intermittently, and perhaps due to potholes or other deficiencies in the surface of the route segment or other factors. A number of other route segments, e.g., segment 408, are characterized (or designated or identified) in mapping information as "moderate." As used herein, a "moderate" route segment is one that the vehicle (and passengers or contents thereof) experiences as not particularly bumpy and/or bouncy, either constantly or intermittently, but also not particularly comfortable due to the occasional deficiencies in the surface of the route segment or other factors. The mapping information may include historical sensor data (e.g. data from vehicle suspension, accelerometers, IMUs, etc.) from vehicles previously traversing the route segment, 3D LiDAR point cloud data of road surfaces, approximations of road quality based thereon, user feedback from previous passengers of vehicles traversing the road segment, or any combination thereof.

Finally, a number of remaining route segments, e.g., segment 410, are characterized (or designated or identified) in mapping information as "smooth." As used herein, a "smooth" route segment is one that the vehicle (and passengers or contents thereof) experiences as comfortable and relatively free of bumps and/or bounces. As shown in FIG. 4, route 400A is the shortest route between the origin 402 and the destination 404, but includes the highest percentage of rough segments 406 (i.e., segments characterized as rough) of all the routes 400. Route 400C is the longest route between the origin 402 and the designation 404, but includes the highest percentage of smooth segments 410 (i.e., segments characterized as smooth) and the lowest percentage of rough segments 406 of all the routes 400. Finally, route 400B is not as short as route 400A and not a long as 400C and the highest percentage of moderate segments 408 (i.e., segments characterized as moderate) of all the routes 400. Given the foregoing mapping information of FIG. 4 as an example, in one embodiment, the route selection module would select route 400A for delivering a sturdy item from the origin 402 to the destination 404, route 400C for delivering a fragile item from the origin to the destination, and route 400B for items that are neither particularly sturdy or particularly fragile. It is to be understood that, while FIG. 4 shows three exemplary categories of route segments, any number may be used or, alternatively, roughness of a route may be evaluated continuously instead of discretely. In some embodiments, each category may be defined by one or more upper and lower thresholds corresponding to a type of mapping information.

Figure 5:
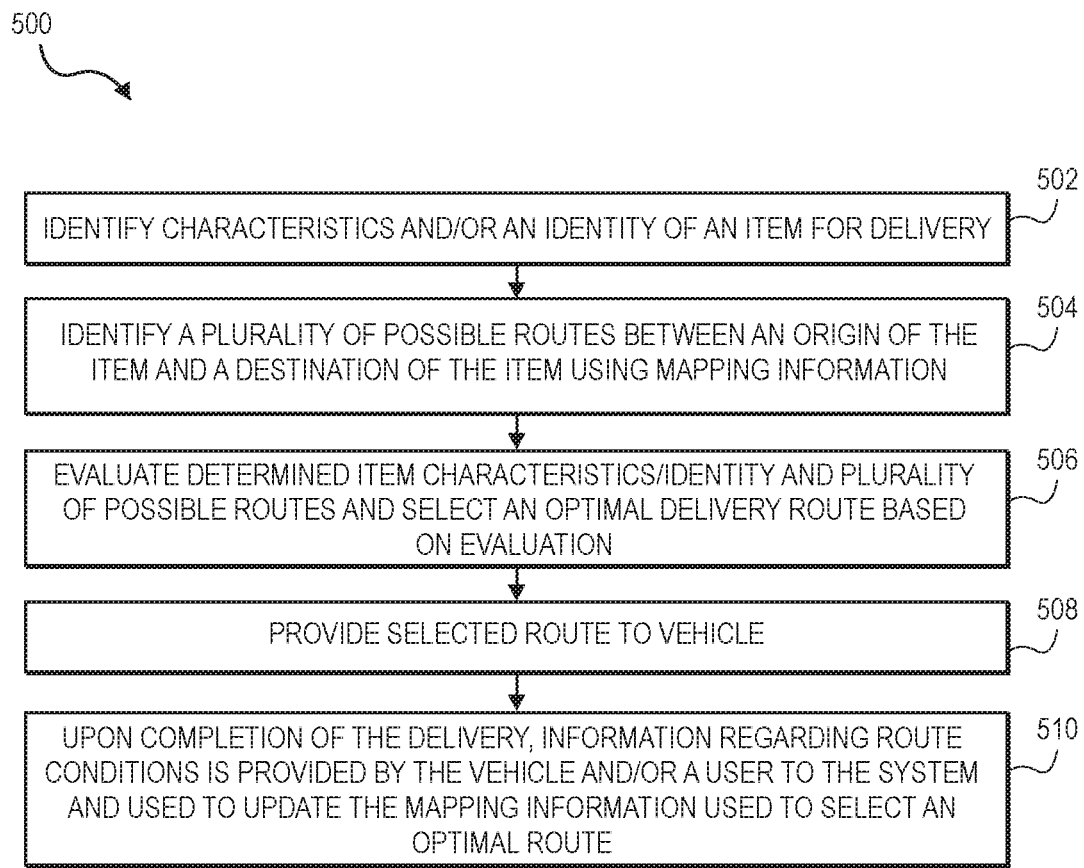
FIG. 5 is a flowchart of another example method implemented by an example intelligent delivery system according to alternative embodiments of the present disclosure.

FIG. 5 is a flowchart of an alternative example method 500 implemented by an intelligent delivery system according to some embodiments of the present disclosure, such as the intelligent delivery system 200 of FIG. 2.

In step 502, characteristics and/or an identity of an item for delivery are determined. It will be recognized that this step may be performed in any number of manners. For example, the item for delivery may have affixed thereto a code (such as a bar code or QR code, for example) or an RF ID that may be read by an appropriate sensor disposed within the vehicle. Alternatively, visual sensors, such as a camera, may be used to discern characteristics and/or the identity of the item. Still further, information regarding characteristics and/or an identity of the item may be provided by an individual, such as a system administrator or operator. The information gleaned in step 502 may include such information as physical state of the item (e.g., solid or liquid), a durability of the item (e.g., sturdy or fragile), and whether or not the item is perishable (and if so, within what time frame), for example.

In step 504, a plurality of possible routes between an origin of the item and a destination of the item may be identified using mapping information.

In step 506, the information regarding characteristics and/or an identity of the item as well as the plurality of possible routes are evaluated to select an optimal delivery route, e.g., by weighting and/or characterizing segments of each route based on the condition of the segment. For example, if the item being delivered is fragile (e.g., a flower arrangement) and/or a liquid (e.g., a container of soup), a longer, but smoother, route (i.e., a route with a high percentage of route segments characterized in mapping information as smooth) may be preferable over a shorter, but bumpier, route, with the increase in delivery time being justifiable in view of the desire to avoid spilling or damaging the item. Alternatively, if the item being delivered is sturdy and durable (e.g., a well-packed box), a shorter, if bumpier, route (i.e., a route with a high percentage of route segments characterized in mapping information as "rough") may be preferable to decrease delivery time. For items that are neither particularly sensitive or durable, an intermediate route (i.e., a route having a high percentage of route segments characterized as "moderate") may be selected.

In step 508, the selected route is provided to the vehicle.

In step 510, upon completion of the delivery, information regarding the route (e.g., actual route conditions that may include sensor data as previously described) is provided by the vehicle and/or a user to a remote system, for example, which uses the route information to update the mapping information used to select an optimal route.

Figure 6:
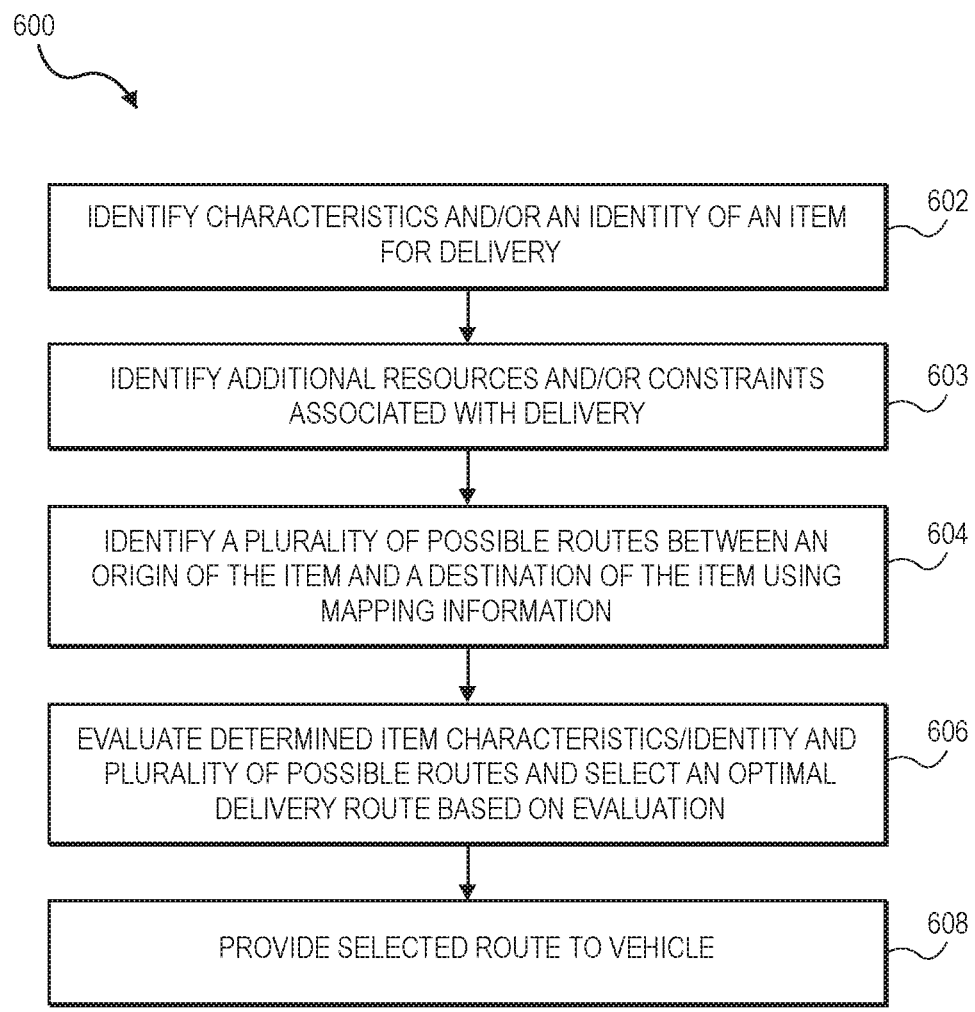
FIG. 6 is a flowchart of yet another example method implemented by an example intelligent delivery system according to alternative embodiments of the present disclosure.

FIG. 6 is a flowchart of another alternative method 600 implemented by an intelligent delivery system according to some embodiments of the present disclosure, such as the intelligent delivery system 200 of FIG. 2.

In step 602, characteristics and/or an identity of an item for delivery are determined. It will be recognized that this step may be performed in any number of manners. For example, the item for delivery may have affixed thereto a code (such as a bar code or QR code, for example) or an RF ID that may be read by an appropriate sensor disposed within the vehicle. Alternatively, visual sensors, such as a camera, may be used to discern characteristics and/or the identity of the item. Still further, information regarding characteristics and/or an identity of the item may be provided by an individual, such as a system administrator or operator. The information gleaned in step 602 may include such information as physical state of the item (e.g., solid or liquid), a durability of the item (e.g., sturdy or fragile), and whether or not the item is perishable (and if so, within what time frame), for example.

In step 603, additional resources and/or constraints, such as fee/price, amount of fuel required, amount of fuel available, and/or a time limit in which the delivery must be made, for example, are identified. These additional resources and/or constraints may be determined based on circumstances or imposed by a user or system operator/administrator. For example, a user may indicate that a particular delivery must be made within a certain period of time. Additionally and/or alternatively, there may only be a certain amount of fuel in the vehicle to make the delivery and/or the delivery must be made for a particular fee.

In step 604, a plurality of possible routes between an origin of the item and a destination of the item may be identified using mapping information.

In step 606, the information gleaned in steps 602 and 603, as well as the plurality of possible routes are evaluated to select an optimal delivery route, e.g., by weighting and/or characterizing segments of each route based on the condition of the segment. For example, if the item being delivered is fragile (e.g., a flower arrangement) and/or a liquid (e.g., a container of soup), a longer, but smoother, route (i.e., a route with a high percentage of route segments characterized in mapping information as smooth) may be preferable over a shorter, but bumpier, route, with the increase in delivery time being justifiable in view of the desire to avoid spilling or damaging the item. Alternatively, if the item being delivered is sturdy and durable (e.g., a well-packed box), a shorter, if bumpier, route (i.e., a route with a high percentage of route segments characterized in mapping information as "rough") may be preferable to decrease delivery time. For items that are neither particularly sensitive or durable, an intermediate route (i.e., a route having a high percentage of route segments characterized as "moderate") may be selected.

In step 608, the selected route is provided to the vehicle.

Example 1 is a method comprising identifying at least one of a characteristic and an identity of an item for delivery from an origin to a destination; identifying a plurality of possible routes between the origin and the destination using mapping information, the mapping information including for each of the plurality of possible routes, a characterization of each of a plurality of route segments comprising the possible route; evaluating the plurality of possible routes in view of the identified at least one of the item characteristic and the item identity to select one of the plurality of possible routes; and providing the selected one of the plurality of possible routes to a vehicle, wherein the vehicle delivers the item from the origin to the destination via the identified route.

In Example 2, the method of Example 1 may further include the item characteristic comprising at least one of a sturdiness of the item, a physical state of the item, and a perishability of the item.

In Example 3, the method of any of Examples 1-2 may further include the item identity being identified by reading a code associated with the item.

In Example 4, the method of any of Examples 1-3 may further include the item identity being identified by information provided by a user.

In Example 5, the method of any of Examples 1-4 may further include the item identity being identified using imaging devices to capture one or more images of the item by which to identify the item.

In Example 6, the method of any of Examples 1-5 may further include the evaluating further comprising characterizing each of the route segments according to a relative comfort level experienced by contents of the vehicle while traversing the route segment and assigning a route type to the route segment corresponding to the characterization thereof.

In Example 7, the method of any of Examples 1-6 may further include the evaluating further comprising identifying a type of route segment that corresponds to the item based on the identified at least one of item characteristic and item identity.

In Example 8, the method of any of Examples 1-7 may further include the selecting further comprising selecting the one of the plurality of possible routes that has a highest percentage of route segments of the identified type.

In Example 9, the method of any of Examples 1-8 may further include, subsequent to completion of a delivery of the item, updating the mapping information for at least one of the route segments of the selected route using information provided by at least one of the vehicle and a vehicle passenger regarding the comfort level of the route segment.

In Example 10, the method of any of Examples 1-9 may further include identifying at least one additional constraint in connection with a delivery of the item, wherein the evaluating further comprises evaluating the plurality of possible routes in view of the identified at least one of the item characteristic and the item identity in combination with the identified at least one additional constraint to select the one of the plurality of possible route.

Example 11 is an intelligent delivery system for a vehicle, which may include at least one sensing device for determining at least one of a characteristic and an identity of an item for delivery from an origin to a destination; a mapping information module for storing mapping information comprising information regarding a plurality of possible routes from the origin to the destination, the mapping information including for each of the plurality of possible routes, a characterization of each of a plurality of route segments comprising the possible route; and a route selection module for evaluating the plurality of possible routes in view of the identified at least one of the item characteristic and the item identity to select one of the plurality of possible routes.

In Example 12, the intelligent delivery system of Example 11 may further include the route selection module further providing the selected one of the plurality of possible routes to a vehicle, wherein the vehicle delivers the item from the origin to the destination via the identified route.

In Example 13, the intelligent delivery system of any of Examples 11-12 may further include the vehicle comprising an autonomous vehicle.

In Example 14, the intelligent delivery system of any of Examples 11-13 may further include the evaluating comprising characterizing each of the route segments according to a relative comfort level experienced by contents of the vehicle while traversing the route segment and assigning a route type to the route segment corresponding to the characterization thereof; and identifying a type of route segment that corresponds to the item based on the identified at least one of item characteristic and item identity.

In Example 15, the intelligent delivery system of any of Examples 11-14 may further include, subsequent to completion of a delivery of the item, the mapping information for at least one of the route segments of the selected route being updated using information provided by at least one of the vehicle and a vehicle passenger regarding the comfort level of the route segment.

In Example 16, the intelligent delivery system of any of Examples 11-15 may further include at least one additional constraint in connection with a delivery of the item being identified and wherein the evaluating further comprises evaluating the plurality of possible routes in view of the identified at least one of the item characteristic and the item identity in combination with the identified at least one additional constraint to select the one of the plurality of possible routes.

Example 17 is a vehicle comprising an onboard computer; a sensor suite comprising a plurality of imaging devices and at least one sensing device for determining at least one of a characteristic and an identity of an item for delivery from an origin to a destination; a mapping information module for storing mapping information comprising information regarding a plurality of possible routes from the origin to the destination, the mapping information including for each of the plurality of possible routes, a characterization of each of a plurality of route segments comprising the possible route; and a route selection module for evaluating the plurality of possible routes in view of the identified at least one of the item characteristic and the item identity to select one of the plurality of possible routes.

In Example 18, the vehicle of Example 17 may further include the route selection module providing the selected one of the plurality of possible routes to a vehicle, wherein the vehicle delivers the item from the origin to the destination via the identified route.

In Example 19, the vehicle of any of Examples 17-18 may further comprise the evaluating including characterizing each of the route segments according to a relative comfort level experienced by contents of the vehicle while traversing the route segment and assigning a route type to the route segment corresponding to the characterization thereof; and identifying a type of route segment that corresponds to the item based on the identified at least one of item characteristic and item identity.

In Example 20, the vehicle of any of Examples 17-19 may further include the selecting comprising selecting the one of the plurality of possible routes that has a highest percentage of route segments of the identified type.

Example 21 is a method comprising identifying at least one of a characteristic and an identity of an item for delivery from an origin to a destination; identifying a plurality of possible routes between the origin and the destination using mapping information, the mapping information including for each of the plurality of possible routes, a characterization of each of a plurality of route segments comprising the possible route; evaluating the plurality of possible routes in view of the identified at least one of the item characteristic and the item identity to select one of the plurality of possible routes; providing the selected one of the plurality of possible routes to a vehicle, wherein the vehicle delivers the item from the origin to the destination via the identified route; and subsequent to completion of a delivery of the item, updating the mapping information for at least one of the route segments of the selected route using information provided by at least one of the vehicle and a vehicle passenger regarding the comfort level of the route segment.

Example 22 is a method comprising identifying at least one of a characteristic and an identity of an item for delivery from an origin to a destination; identifying a plurality of possible routes between the origin and the destination using mapping information, the mapping information including for each of the plurality of possible routes, a characterization of each of a plurality of route segments comprising the possible route; identifying at least one additional constraint in connection with a delivery of the item; evaluating the plurality of possible routes in view of the identified at least one of the item characteristic and the item identity and the at least one additional constraint to select one of the plurality of possible routes; and providing the selected one of the plurality of possible routes to a vehicle, wherein the vehicle delivers the item from the origin to the destination via the identified route.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

In one example embodiment, any number of electrical circuits of the FIGS. may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), computer-readable non-transitory memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself. In various embodiments, the functionalities described herein may be implemented in emulation form as software or firmware running within one or more configurable (e.g., programmable) elements arranged in a structure that supports these functions. The software or firmware providing the emulation may be provided on non-transitory computer-readable storage medium comprising instructions to allow a processor to carry out those functionalities.

In another example embodiment, the electrical circuits of the FIGS. may be implemented as stand-alone modules (e.g., a device with associated components and circuitry configured to perform a specific application or function) or implemented as plug-in modules into application specific hardware of electronic devices. Note that particular embodiments of the present disclosure may be readily included in a system on chip (SOC) package, either in part, or in whole. An SOC represents an IC that integrates components of a computer or other electronic system into a single chip. It may contain digital, analog, mixed-signal, and often radio frequency functions: all of which may be provided on a single chip substrate. Other embodiments may include a multi-chip-module (MCM), with a plurality of separate ICs located within a single electronic package and configured to interact closely with each other through the electronic package. In various other embodiments, the digital filters may be implemented in one or more silicon cores in Application Specific Integrated Circuits (ASICs), Field Programmable Gate Arrays (FPGAs), and other semiconductor chips.

It is also imperative to note that all of the specifications, dimensions, and relationships outlined herein (e.g., the number of processors, logic operations, etc.) have only been offered for purposes of example and teaching only. Such information may be varied considerably without departing from the spirit of the present disclosure, or the scope of the appended claims. The specifications apply only to one non-limiting example and, accordingly, they should be construed as such. In the foregoing description, example embodiments have been described with reference to particular arrangements of components. Various modifications and changes may be made to such embodiments without departing from the scope of the appended claims. The description and drawings are, accordingly, to be regarded in an illustrative rather than in a restrictive sense.

Note that with the numerous examples provided herein, interaction may be described in terms of two, three, four, or more electrical components. However, this has been done for purposes of clarity and example only. It should be appreciated that the system can be consolidated in any suitable manner. Along similar design alternatives, any of the illustrated components, modules, and elements of the FIGS. may be combined in various possible configurations, all of which are clearly within the broad scope of this Specification. In certain cases, it may be easier to describe one or more of the functionalities of a given set of flows by only referencing a limited number of electrical elements. It should be appreciated that the electrical circuits of the FIGS. and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

It is also important to note that the functions related to contactless current measurement using magnetic sensors, e.g. those summarized in the one or more processes shown in FIGS., illustrate only some of the possible functions that may be executed by, or within, the current measurement systems illustrated in the FIGS. Some of these operations may be deleted or removed where appropriate, or these operations may be modified or changed considerably without departing from the scope of the present disclosure. In addition, the timing of these operations may be altered considerably. The preceding operational flows have been offered for purposes of example and discussion. Substantial flexibility is provided by embodiments described herein in that any suitable arrangements, chronologies, configurations, and timing mechanisms may be provided without departing from the teachings of the present disclosure.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. Note that all optional features of the apparatus described above may also be implemented with respect to the method or process described herein and specifics in the examples may be used anywhere in one or more embodiments.

In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph (f) of 35 U.S.C. Section 112 as it exists on the date of the filing hereof unless the words "means for" or "step for" are specifically used in the particular claims; and (b) does not intend, by any statement in the Specification, to limit this disclosure in any way that is not otherwise reflected in the appended claims.

What is claimed is:

1. A method comprising:
identifying for an item for delivery from an origin to a destination characteristic of the item and an identity of the item;
identifying a plurality of possible routes between the origin and the destination using mapping information, the mapping information including for each of the plurality of possible routes, a characterization of a physical condition of a driving surface of each of a plurality of route segments comprising the possible route, wherein the characterization is based on historical sensor data collected by a plurality of additional vehicles, the sensor data comprising vehicle suspension data, inertial measurement unit data, and accelerometer data;
identifying at least one additional constraint in connection with a delivery of the item;
evaluating the plurality of possible routes and selecting one of the plurality of possible routes based on the item characteristic, the item identity, and the at least one additional constraint in combination with the characterization of the physical condition of the driving surface of each of the plurality of route segments;

providing the selected one of the plurality of possible routes to a vehicle, wherein the vehicle delivers the item from the origin to the destination via the identified route; and wherein the at least one additional constraint comprises at least one of an amount of fuel necessary to deliver the item and an amount of fuel available in the vehicle; and wherein the item characteristic comprises at least one of a sturdiness of the item, a fragility of the item, and a perishability of the item.

2. The method of claim 1, wherein the item identity is identified by reading a code associated with the item.

3. The method of claim 1, wherein the item identity is identified by information provided by a user.

4. The method of claim 1, wherein the item identity is identified using imaging devices to capture one or more images of the item by which to identify the item.

5. The method of claim 1, wherein the evaluating further comprises characterizing each of the route segments according to a physical impact on by contents of the vehicle while traversing the route segment and assigning a route type to the route segment corresponding to the characterization thereof.

6. The method of claim 5, wherein the evaluating further comprises identifying a type of route segment that corresponds to the item based on the identified at least one of item characteristic and item identity.

7. The method of claim 6, wherein the selecting further comprises selecting the one of the plurality of possible routes that has a highest percentage of route segments of the identified type.

8. The method of claim 1 further comprising, subsequent to completion of a delivery of the item, updating the mapping information for at least one of the route segments of the selected route using information provided by at least one of the vehicle and a vehicle passenger regarding the comfort level of the route segment.

9. An intelligent delivery system for a vehicle, the intelligent delivery system comprising:

at least one sensing device for determining for an item for delivery from an origin to a destination a characteristic of the item and an identity of the item;

a mapping information module for storing mapping information comprising information regarding a plurality of possible routes from the origin to the destination, the mapping information including for each of the plurality of possible routes, a characterization of a physical condition of a driving surface of each of a plurality of route segments comprising the possible route, wherein the characterization is based on historical sensor data collected by a plurality of additional vehicles, the sensor data comprising vehicle suspension data, inertial measurement unit data, and accelerometer data; and a route selection module for evaluating the plurality of possible and selecting one of the plurality of possible routes based on the item characteristic and the item identity in combination with the characterization of the physical condition of the driving surface of each of the plurality of route segments;

wherein the item characteristic comprises at least one of a sturdiness of the item, a fragility of the item, and a perishability of the item.

10. The intelligent delivery system of claim 9, wherein the route selection module further provides the selected one of the plurality of possible routes to a vehicle, wherein the vehicle delivers the item from the origin to the destination via the identified route.

11. The intelligent delivery system of claim 9, wherein the vehicle comprises an autonomous vehicle.

12. The intelligent delivery system of claim 9, wherein the evaluating further comprises:

characterizing each of the route segments according to a physical impact on contents of the vehicle while traversing the route segment and assigning a route type to the route segment corresponding to the characterization thereof; and identifying a type of route segment that corresponds to the item based on the identified at least one of item characteristic and item identity.

13. The intelligent delivery system of claim 9, wherein, subsequent to completion of a delivery of the item, the mapping information for at least one of the route segments of the selected route is updated using information provided by at least one of the vehicle and a vehicle passenger regarding the comfort level of the route segment.

14. A vehicle comprising:

an onboard computer;

a sensor suite comprising a plurality of imaging devices and at least one sensing device for determining for an item for delivery from an origin to a destination a characteristic of the item and an identity of the item;

a mapping information module for storing mapping information comprising information regarding a plurality of possible routes from the origin to the destination, the mapping information including for each of the plurality of possible routes, a characterization of a physical condition of a driving surface of each of a plurality of route segments comprising the possible route, wherein the characterization is based on historical sensor data collected by a plurality of additional vehicles, the sensor data comprising vehicle suspension data, inertial measurement unit data, and accelerometer data; and a route selection module for evaluating the plurality of possible and selecting one of the plurality of possible routes based on the item characteristic and the item identity in combination with the characterization of the physical condition of the driving surface of each of the plurality of route segments;

wherein the item characteristic comprises at least one of a sturdiness of the item, a fragility of the item, and a perishability of the item.

15. The vehicle of claim 14, wherein the route selection module further provides the selected one of the plurality of possible routes to a vehicle, wherein the vehicle delivers the item from the origin to the destination via the identified route.

16. The vehicle of claim 14, wherein the evaluating further comprises:

characterizing each of the route segments according to a physical impact on contents of the vehicle while traversing the route segment and assigning a route type to the route segment corresponding to the characterization thereof; and identifying a type of route segment that corresponds to the item based on the identified at least one of item characteristic and item identity.

17. The vehicle of claim 16, wherein the selecting further comprises selecting the one of the plurality of possible routes that has a highest percentage of route segments of the identified type.

18. The intelligent delivery system of claim 9, wherein at least one additional constraint in connection with a delivery of the item is identified and the evaluating further comprises evaluating the plurality of possible routes in view of the identified at least one of the item characteristic and the item identity in combination with the identified at least one additional constraint to select the one of the plurality of possible routes.

19. The intelligent delivery system of claim 18, wherein the at least one additional constraint comprises at least one of a fee charged for delivery of the item, an amount of fuel necessary to deliver the item, and an amount of fuel available in the vehicle.

20. The vehicle of claim 14, wherein at least one additional constraint in connection with a delivery of the item is identified and the evaluating further comprises evaluating the plurality of possible routes in view of the identified at least one of the item characteristic and the item identity in combination with the identified at least one additional constraint to select the one of the plurality of possible routes and wherein the at least one additional constraint comprises at least one of a fee charged for delivery of the item, an amount of fuel necessary to deliver the item, and an amount of fuel available in the vehicle.

\* \* \* \* \*